United States Patent
Kumar et al.

(10) Patent No.: US 11,816,106 B2
(45) Date of Patent: Nov. 14, 2023

(54) MEMORY MANAGEMENT FOR KLL SKETCH

(71) Applicant: Microsoft Technology Licensing, LLC, Redmond, WA (US)

(72) Inventors: Gourav Kumar, Bangalore (IN); Rajkumar Iyer, Bangalore (IN); Ravi Shirish Shetye, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/690,569

(22) Filed: Mar. 9, 2022

(65) Prior Publication Data

US 2023/0289346 A1 Sep. 14, 2023

(51) Int. Cl.
*G06F 16/00* (2019.01)
*G06F 16/2455* (2019.01)
*G06F 12/0871* (2016.01)
*G06F 16/248* (2019.01)
*G06F 12/0882* (2016.01)

(52) U.S. Cl.
CPC .... *G06F 16/24552* (2019.01); *G06F 12/0871* (2013.01); *G06F 16/248* (2019.01); *G06F 16/24568* (2019.01); *G06F 12/0882* (2013.01)

(58) Field of Classification Search
CPC ......... G06F 16/24552; G06F 16/24568; G06F 16/248; G06F 12/0882; G06F 12/0871
USPC .................................................. 707/600–899
See application file for complete search history.

(56) References Cited

U.S. PATENT DOCUMENTS

| | | | | |
|---|---|---|---|---|
| 9,317,470 B1* | 4/2016 | Raley | ..................... | H04L 67/568 |
| 10,769,126 B1* | 9/2020 | Hagerup | ............. | G06F 16/2453 |
| 10,838,990 B1* | 11/2020 | Shilane | ................. | G06F 16/316 |
| 10,929,032 B1* | 2/2021 | Sela | ........................ | G06F 3/061 |
| 11,403,302 B1* | 8/2022 | Ting | ........................ | G06F 16/26 |
| 2009/0106741 A1* | 4/2009 | Dageville | ........... | G06F 11/3636 |
| | | | | 717/128 |
| 2015/0269178 A1* | 9/2015 | Rhodes | ................ | G06F 16/958 |
| | | | | 707/700 |

(Continued)

OTHER PUBLICATIONS

"Approximate aggregate functions", Retrieved from: https://web.archive.org/web/20220206200536/https://cloud.google.com/bigquery/docs/reference/standard-sql/approximate_aggregate_functions, Feb. 6, 2022, 7 Pages.

(Continued)

*Primary Examiner* — Michelle N Owyang
(74) *Attorney, Agent, or Firm* — ARENTFOX SCHIFF LLP

(57) ABSTRACT

The present application relates to managing memory of a KLL sketch for a streaming set. A computer system allocates an initial amount of memory from a computer memory to a buffer of a KLL sketch data structure based on a sparse sketch size independent of a data type of the streaming set. The system allocates an incremental amount of memory greater than or equal to the initial amount of memory from the computer memory to the buffer in response to a size of the streaming set exceeding a supported stream size of the KLL sketch data structure. The system determines a number of levels of the KLL sketch data structure based on a total allocated amount of memory and a size of the data type of the streaming set. The system adds new elements from the streaming set to the KLL sketch data structure based on the number of levels.

20 Claims, 8 Drawing Sheets

(56) References Cited

U.S. PATENT DOCUMENTS

2018/0239792 A1* 8/2018 Ting .................. G06N 7/01

OTHER PUBLICATIONS

"DataSketches Quantiles Sketch module", Retrieved from: https://web.archive.org/web/20200202214852/https://druid.apache.org/docs/latest/development/extensions-core/datasketches-quantiles.html, Feb. 2, 2020, 4 Pages.
"SQL Language Reference—APPROX_PERCENTILE", Retrieved from: https://docs.oracle.com/en/database/oracle/oracle-database/12.2/sqlrf/APPROX_PERCENTILE.html, Retrieved Date: Jan. 13, 2022, 4 Pages.
"Aggregate Functions", Retrieved from: https://web.archive.org/web/20201205225517/https://prestosql.io/docs/current/functions/aggregate.html, Dec. 5, 2020, 11 Pages.
"Window Functions", Retrieved from: https://web.archive.org/web/20201205220859/https://prestosql.io/docs/current/functions/window.html, Dec. 5, 2020, 04 Pages.
"Snowflake—APPROX_PERCENTILE", Retrieved from: https://web.archive.org/web/20210413064351/https://docs.snowflake.com/en/sql-reference/functions/approx_percentile.html, Apr. 13, 2021, 3 Pages.
"Spark", Retrieved from: https://github.com/apache/spark/blob/de360e96d776f51c0fd7c31dcec142feabf3d543/sql/catalyst/src/main/scala/org/apache/spark/sql/catalyst/util/QuantileSummaries.scala#L 27, Oct. 8, 2019, 7 Pages.
"Functions", Retrieved from: https://web.archive.org/web/20211021022808/https://people.apache.org/~pwendell/spark-nightly/spark-master-docs/latest/api/sql/index.html, Oct. 21, 2021, 65 Pages.
"Teradata—Approximate Percentile", Retrieved from: https://docs.teradata.com/reader/AI5zLpFtwEQWIVvpnZgB8g/qou0kORJiQtw0aZAG3lfiw, May 2019, 3 Pages.
"Vertica—APPROXIMATE_PERCENTILE", Retrieved from: https://www.vertica.com/docs/8.1.x/HTML/index.htm#Authoring/SQLReferenceManual/Functions/Aggregate/APPROXIMATE_PERCENTILE.htm, Retrieved Date: Jan. 13, 2022, 1 Page.
Ivkin, et al., "Streaming Quantiles Algorithms with Small Space and Update Time", In Repository of arXiv:1907.00236v1, Jun. 29, 2019, 13 Pages.
Karnin, et al., "Optimal Quantile Approximation in Streams", In Repository of arXiv:1603.05346v2, Apr. 5, 2016, 12 Pages.
"Data Sketches", Retrieved from: https://web.archive.org/web/20151029002858/https://datasketches.github.io/, Oct. 29, 2015, 2 Pages.
Cormode, et al., "Relative Error Streaming Quantiles", In Proceedings of ACM SIGMOD Record, vol. 51, Issue 1, Mar. 2022, pp. 69-76.
Cormode, et al., "Relative Error Streaming Quantiles", In Repository of arXiv:2004.01668v3, May 28, 2021, pp. 1-46.
"International Search Report and Written Opinion Issued in PCT Application No. PCT/US22/051340", dated Mar. 27, 2023, 15 Pages.

* cited by examiner

MEMORY MANAGEMENT FOR KLL SKETCH

BACKGROUND

A database may store large amounts of data in an accessible format. A database management system (DBMS) may be used to create and modify various tables of the database. For example, a DBMS may receive structured query language (SQL) commands from a user or application to perform database operations on the stored database.

In some cases, a database may store a streaming set such as a series of scores, ratings, measurements, or other values. The size of the streaming set may continue to grow over time. For large datasets, some desirable functionality such as count distinct, quantile, etc. are prohibitively costly to apply directly to the datasets due to non-linear nature of the algorithms. Data sketches are one way of implementing probable probabilistic variants of such functionality (which provide bounded error with well-defined probability) that can be implemented in a linear number of passes over the data. These implementations are O(n) in complexity, hence they are much more efficient in terms of query execution time and memory consumption. For example, one known implementation is a KLL sketch (named for original authors Karnin, Lang, and Liberty), which may be used for determining quantile value over a continuous incoming data stream. This sketch on querying quantile values gives a well-defined guarantee about bounded rank-based error with theoretical probability.

Existing implementations of KLL sketch may suffer inefficiencies in practical applications such as use cases in database systems. For example, a KLL sketch is conventionally configured with an initial size of a first level, which determines a capacity of the KLL sketch and a supported stream size. In some use cases such as a group by database operation, where one sketch is created per group, a sparse dataset may be significantly smaller than the memory allocated for each KLL sketch. As another example, as the dataset grows to reach the supported stream size, a KLL sketch may be expanded by allocating space for a new level. The expansion operation involves copying elements from an old buffer to new buffer, and adjusting the level boundaries of all levels, and minor book-keeping updates. For a quickly growing dataset, such expansion operations may result in numerous copying operations. Additionally, as the size of a KLL sketch grows beyond the size of a memory page, the KLL sketch is conventionally moved to a Blob datatype, which results in slower read and write performance. In view of the foregoing, improvements to memory management of KLL sketch may be beneficial.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for managing memory for a streaming set, including: a computer memory configured to store computer-executable instructions and a representation of the streaming set and a processor coupled to the computer memory and configured to execute the instructions. The processor is configured to allocate an initial amount of memory from the computer memory to a buffer of a KLL sketch data structure based on a sparse sketch size independent of a data type of the streaming set. The processor is configured to allocate an incremental amount of memory greater than or equal to the initial amount of memory from the computer memory to the buffer of the KLL sketch data structure in response to a size of the streaming set exceeding a supported stream size of the KLL sketch data structure. The processor is configured to determine a number of levels of the KLL sketch data structure based on a total allocated amount of memory and a size of the data type of the streaming set. The processor is configured to add new elements from the streaming set to the KLL sketch data structure based on the number of levels.

In another aspect, the techniques described herein relate to a method of managing memory for a representation of a streaming set. The method includes allocating an initial amount of memory from the computer memory to a buffer of a KLL sketch data structure based on a sparse sketch size independent of a data type of the streaming set. The method includes allocating an incremental amount of memory greater than the initial amount of memory from the computer memory to the buffer of the KLL sketch data structure in response to a size of the streaming set exceeding a supported stream size of the KLL sketch data structure. The method includes determining a number of levels of the KLL sketch data structure based on a total allocated amount of memory and a size of the data type of the streaming set. The method includes adding new elements from the streaming set to the KLL sketch data structure based on the number of levels.

In some implementations, the techniques described herein relate to a non-transitory computer-readable medium storing computer-executable code for managing memory for a representation of a streaming set. The non-transitory computer-readable medium includes code to allocate an initial amount of memory from the computer memory to a buffer of a KLL sketch data structure based on a sparse sketch size independent of a data type of the streaming set. The non-transitory computer-readable medium includes code to set a dynamic error bound for queries of the KLL sketch data structure based on an initial estimated size of the streaming set and the initial amount of memory. The non-transitory computer-readable medium includes code to determine a number of levels of the KLL sketch data structure based on a total allocated amount of memory and a size of the data type of the streaming set. The non-transitory computer-readable medium includes code to add new elements from the streaming set to the KLL sketch data structure based on the number of levels. The non-transitory computer-readable medium includes code to update the dynamic error bound based on a current stream size greater than the initial estimated size and the total allocated amount of memory.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to memory management for a KLL sketch, which may be a representation of a streaming set. For example, the KLL sketch may be implemented in a database system and may be queried to provide values such as an approximate quantile or approximate rank for the streaming set that is stored in the database. In an aspect, the disclosure provides for an automatically expanding sketch implementation that conserves memory for sparse sketches and reduces copying operations as the sketch expands. In another aspect, the disclosure provides for a paged sketch implementation that stores the KLL sketch over multiple pages to support large stream sizes without performance implications of Blob datatype storage. In another aspect, the disclosure provides for vectorized implementations of KLL sketch operations to improve processing performance. In another aspect, the disclosure provides adaptive error bounds based on a size of the streaming dataset for the case of a fixed memory allocation.

The disclosed techniques for memory management for KLL sketch may provide additional functionality to database systems or other systems processing streaming sets. The disclosed techniques may provide improved performance and/or reduced resource consumption (e.g., memory allocated to the KLL sketch).

Figure 4:
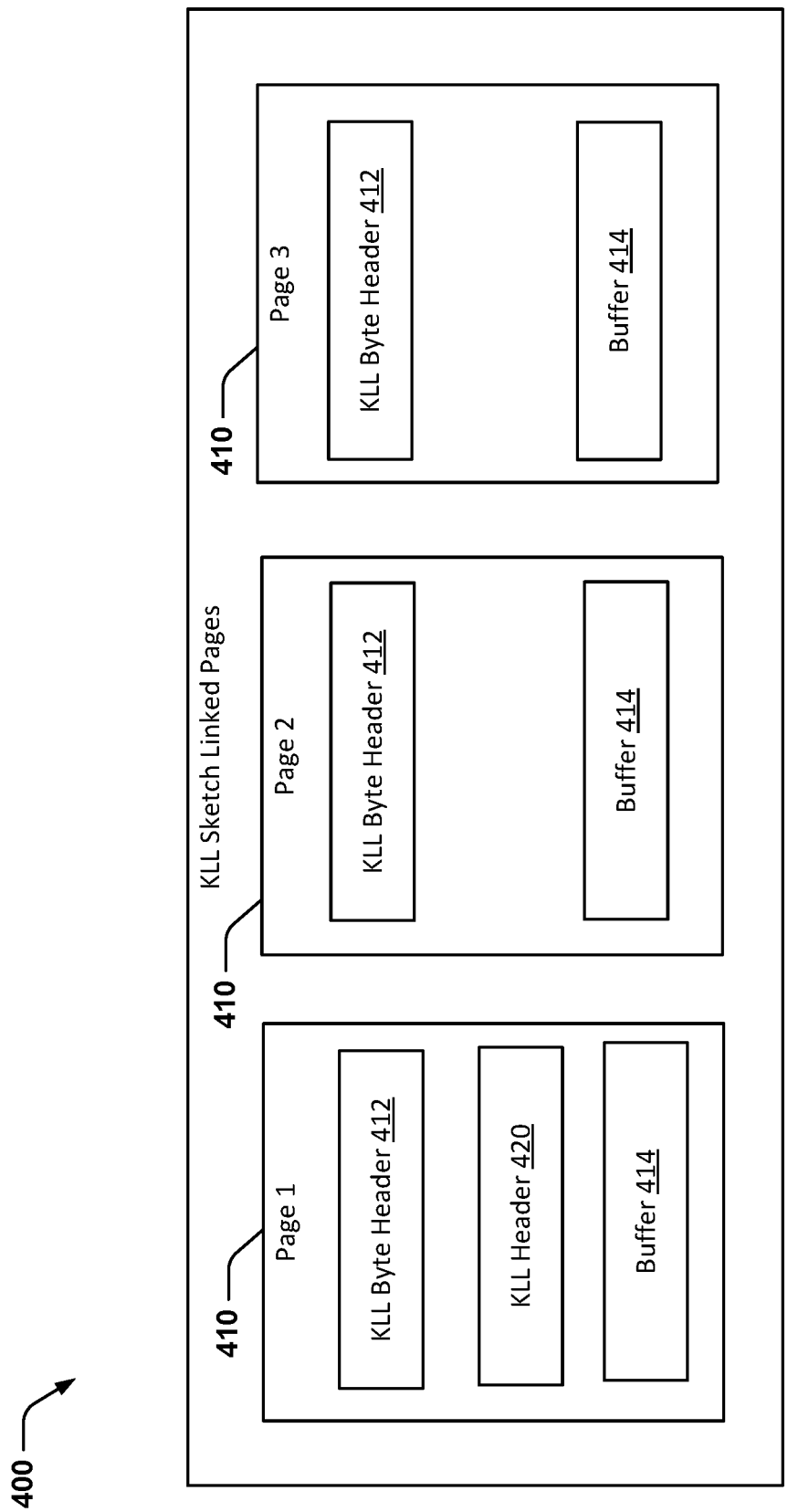
FIG. 4 is a diagram of an example of a linked page structure for a KLL sketch.
Figure 5:
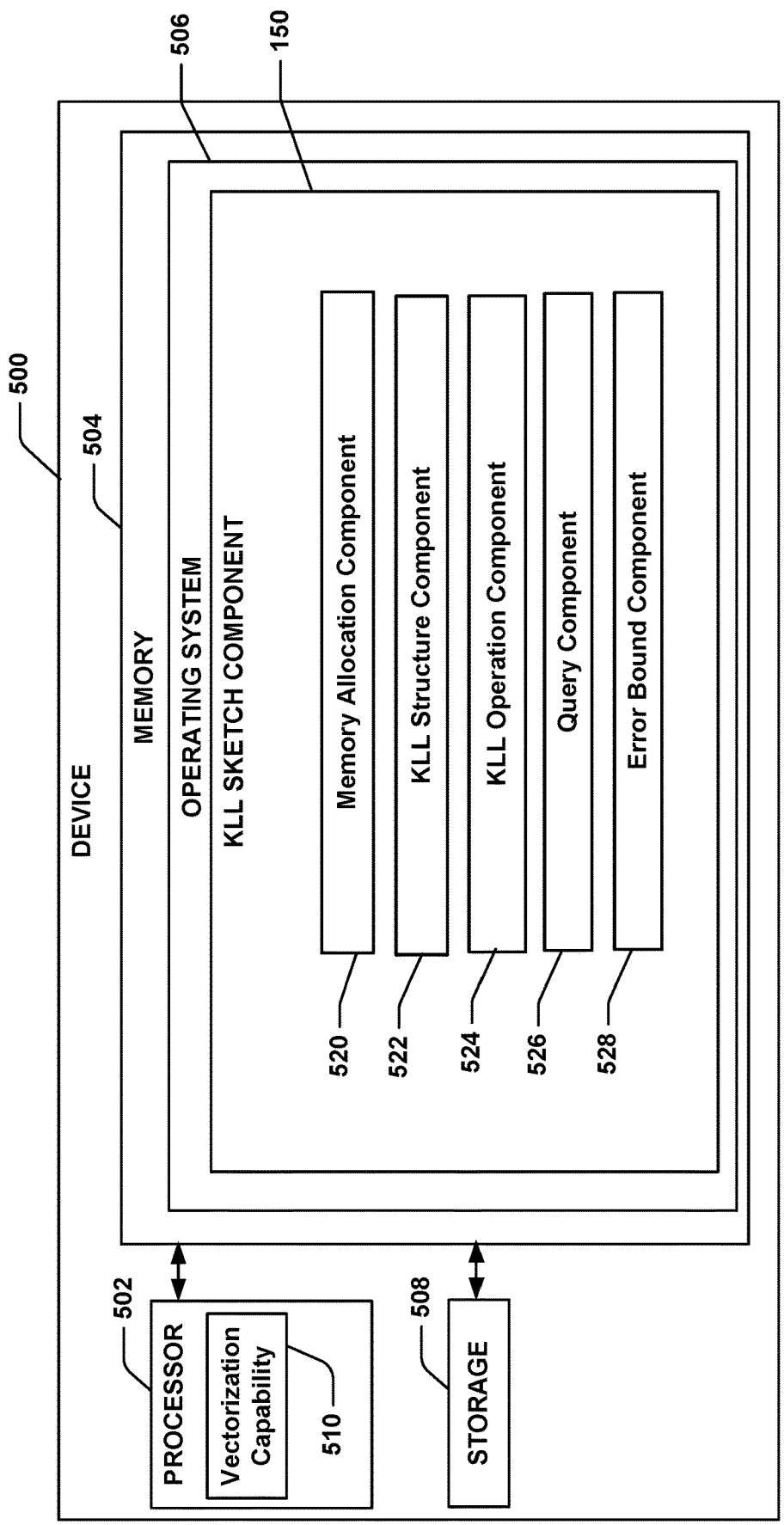
FIG. 5 is a schematic diagram of an example of an apparatus for executing an application that utilizes a KLL sketch.
Figure 6:
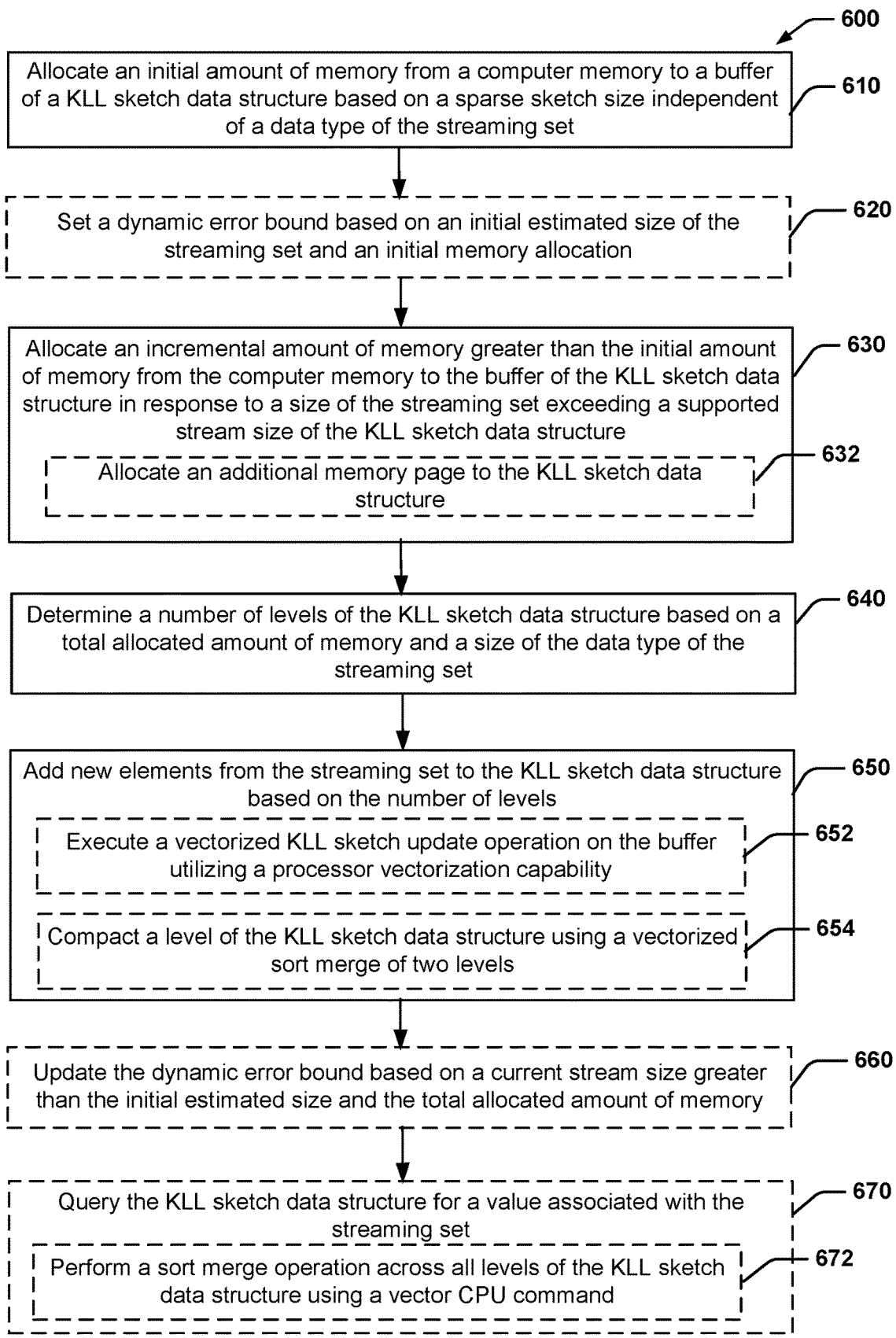
FIG. 6 is a flow diagram of an example of a method for managing memory for a representation of a streaming set.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
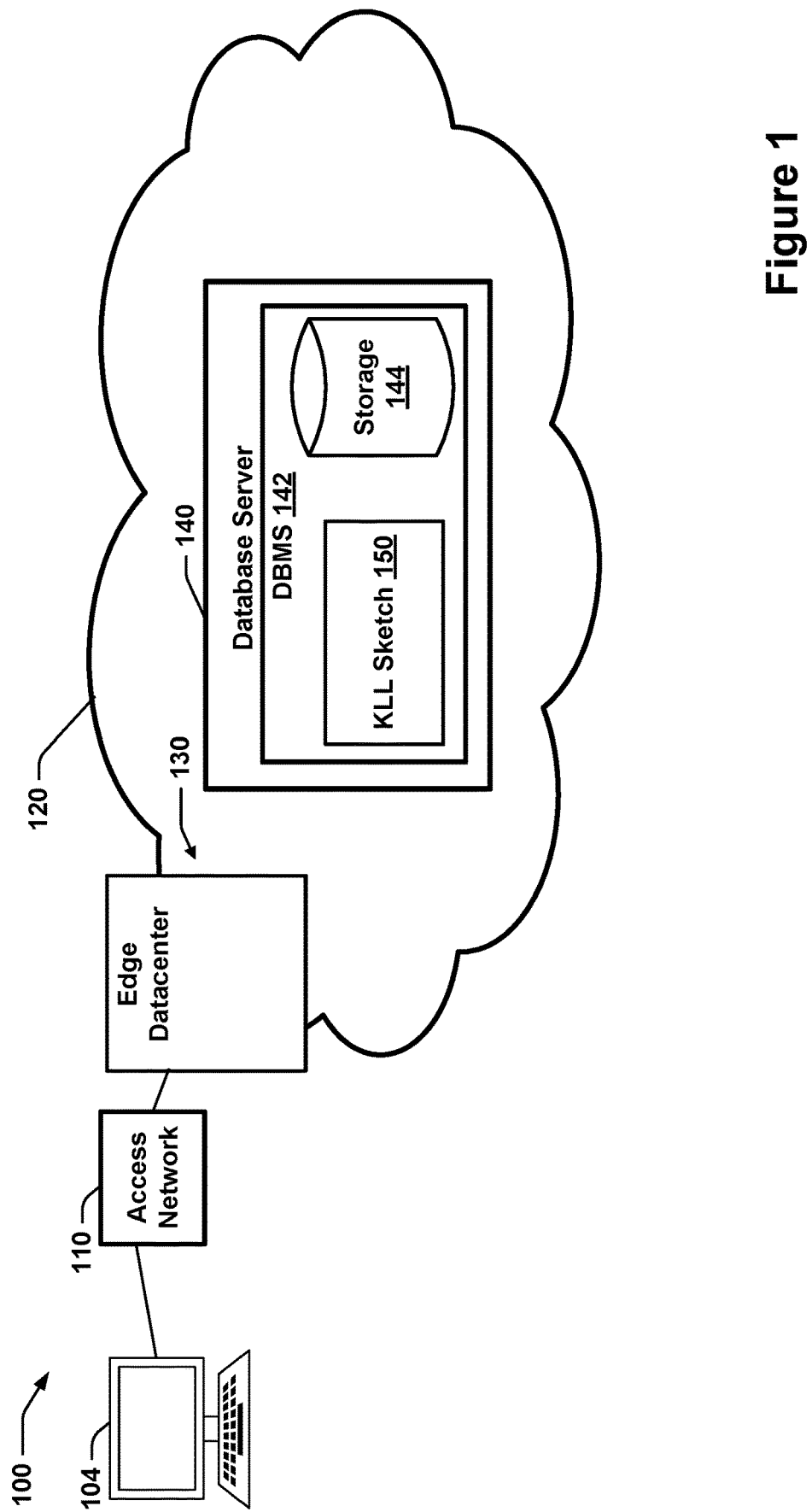
FIG. 1 is a conceptual diagram of an example of an architecture for a database service deployed in a network.

FIG. 1 is a conceptual diagram of an example of a system 100 for a database service deployed in a network 120. The network 120 may be, for example, a wide area network (WAN). The network 120 may be connected to other networks such as an access network 110 to provide services to devices 104. For example, the database service may be an application that includes multiple microservices. Each microservice may be deployed as multiple instances of the microservice that execute on computing resources of the network 120. For example, a microservice that provides a user interface of the application to user devices 104 may be instantiated on an edge datacenter 130. An edge datacenter 130 may include peering connections to other networks (e.g., access network 110). In contrast, a database server 140 may reside at a central datacenter. A datacenter may include one or more hardware computer servers. In some implementations, the hardware computer servers may host virtual machines (VMs), which in turn host services.

For example, the database server 140 may host a database management service (DBMS) 142 configured to perform database operations. For example, the DBMS 142 may receive database commands from a user device 104 and/or network applications, which may be referred to as actors. The DBMS 142 may store data for the database in a data storage 144, which may be co-located with the DBMS 142, or may be remotely located (e.g., in another datacenter). In an aspect, the DBMS 142 may include a KLL sketch component 150 configured to maintain a KLL sketch for one or more streaming sets. The streaming sets may be stored in the storage 144 as data. For example, the KLL sketch component 150 may store a KLL sketch data structure within a random access memory (RAM) of the database server 140, which may allow quick updates and querying of the KLL sketch data structure.

Although an example of the KLL sketch component 150 and KLL sketch data structure are described in the context of a database server 140 and DBMS 142 in examples herein, the KLL sketch component 150 and KLL sketch data structure may be utilized in other computing environments with streaming data. For example, in one use case, a monitoring device may receive streaming measurements from a sensor. The monitoring device may include a KLL sketch component 150 that stores a KLL sketch data structure representing the streaming measurements but does not actually store the entire streaming data set. Instead, the KLL sketch component 150 may answer queries regarding the streaming measurements such as quantile of a value.

Figure 2:
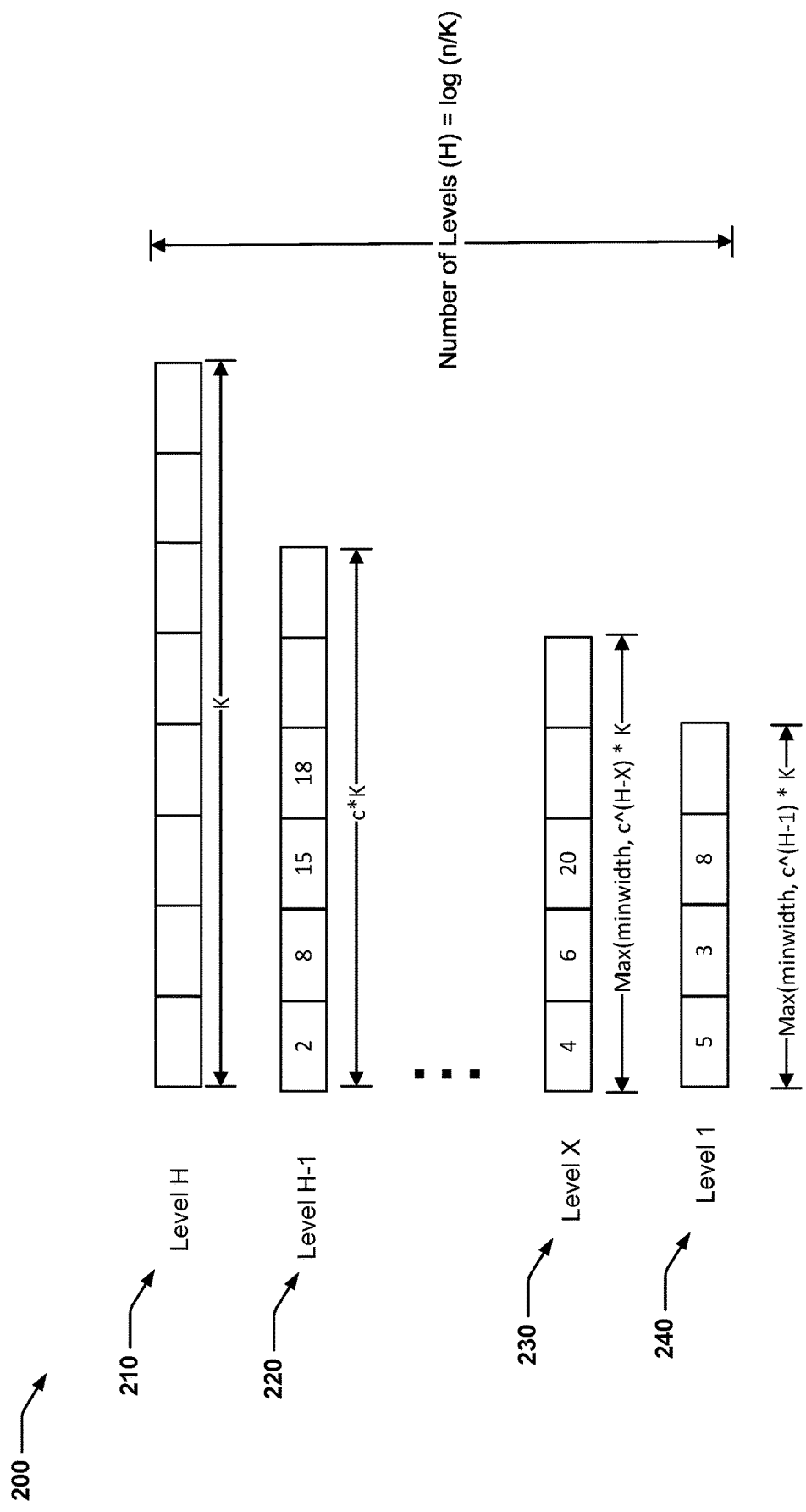
FIG. 2 is a diagram of an example KLL data structure.

FIG. 2 is a diagram of an example of a KLL sketch data structure 200. Generally, a KLL sketch data structure 200 is a group of arrays of different lengths arranged in an order. A KLL sketch data structure 200 may be defined by several parameters. For example, the parameter (K) may refer to a number of elements in a highest level of the KLL sketch data structure 200. A parameter (n) may refer to a maximum supported size of the streaming set. A parameter (H) may refer to the number of levels in the KLL sketch data structure. Conventionally, a KLL sketch may include log (n/K) levels. For simplicity, the levels may be referred to as level 1 (or L1) through level H, although an index starting at level 0 may be used in some implementations. A parameter (c) may define a decay factor by which level size decreases from the top level. The parameter c may have a value less between 0.5 and 1 (e.g., c=¾ is illustrated) and is fixed for each KLL sketch data structure 200. A level X may have a maximum size of K*c^(H−X). A parameter (minwidth) may refer to a minimum width of a level and must be greater than 2.

Generally, new elements of a streaming data set are added to the lowest level 240 (e.g., Level 1), which is unsorted. When the lowest level 240 is full, the lowest level is compacted into higher levels. For example, to compact the lowest level 240, the lowest level 240 is sorted, half of the elements of the lowest level 240 are removed (e.g., odd or even indices), and the lowest level 240 is merged with the above level 230. If the above level 230 includes more elements than the capacity of the level, the level 230 may be compacted into the above level 220 following the same procedure. The levels may be compacted up to level H 210. If the size of level H 210 grows larger than K and needs to be compacted, the data structure 200 may be copied into a larger data structure with more levels using more memory.

Adding more memory involves copying elements from an old memory buffer storing the data structure 200 to new memory buffer, and adjusting the level boundaries of all levels, and minor book-keeping updates. The size of the new buffer is based on the depth of the level to be added. For example, when a level is added at depth d, the size to be added is c^d*k, that is, the size of the buffer grows by the capacity of the newly added level. This approach of allocating more memory assumes unbounded memory, and whenever more space is required, space is incremented by the capacity of the new level to be added. For example, a KLL sketch with (k=200, c=⅔) may have 5 levels. The capacity of these levels will be 200, 133, 88, 59, and 39, respectively. The capacity of each level is c^depth*k, and the total sketch capacity is 519. The maximum supported streaming size (n) is n=ΣK*2$^{H-1}$, which is equal to 4773 for 5 levels.

At some point after more additions and compactions, when the KLL sketch needs more memory the memory is allocated in terms of capacity of the next level to be added. Considering the above example, when a sixth level is added, based on decrementing level sizes, the size of the sixth level will be 26. That is, the total sketch capacity is increased by 26. Accordingly, the memory allocation operation including copying the buffer results in a relatively small increase in capacity. Eventually, the new level capacity goes to the minimum size of a level (minwidth), resulting in small increases in capacity. For a large or rapidly growing stream, increasing the size of the data structure 200 may result in frequent memory re-allocations.

Figure 3A:
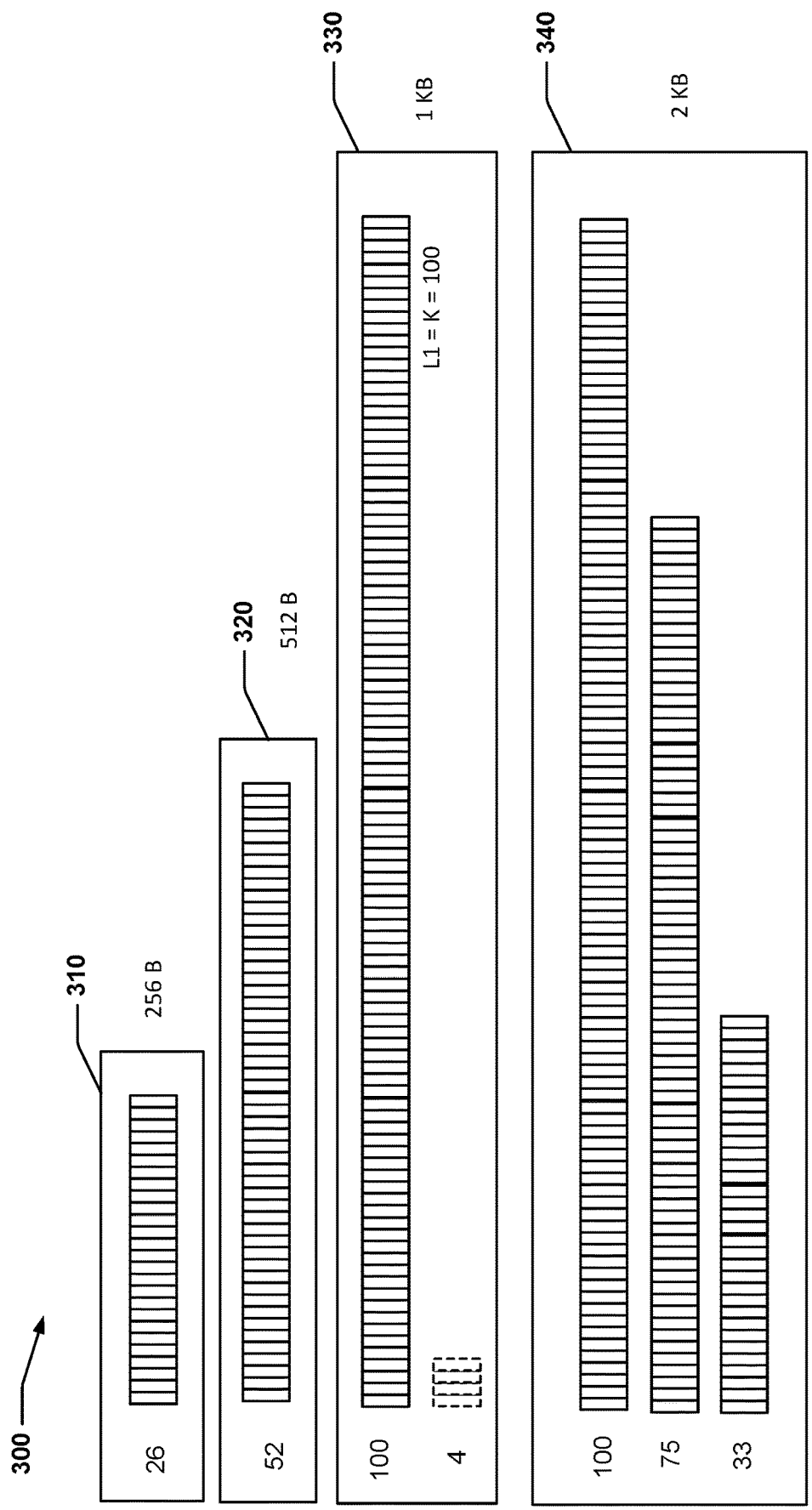
FIGS. 3A and 3B are diagrams of an example of an automatically expanding KLL data structure.
Figure 3B:
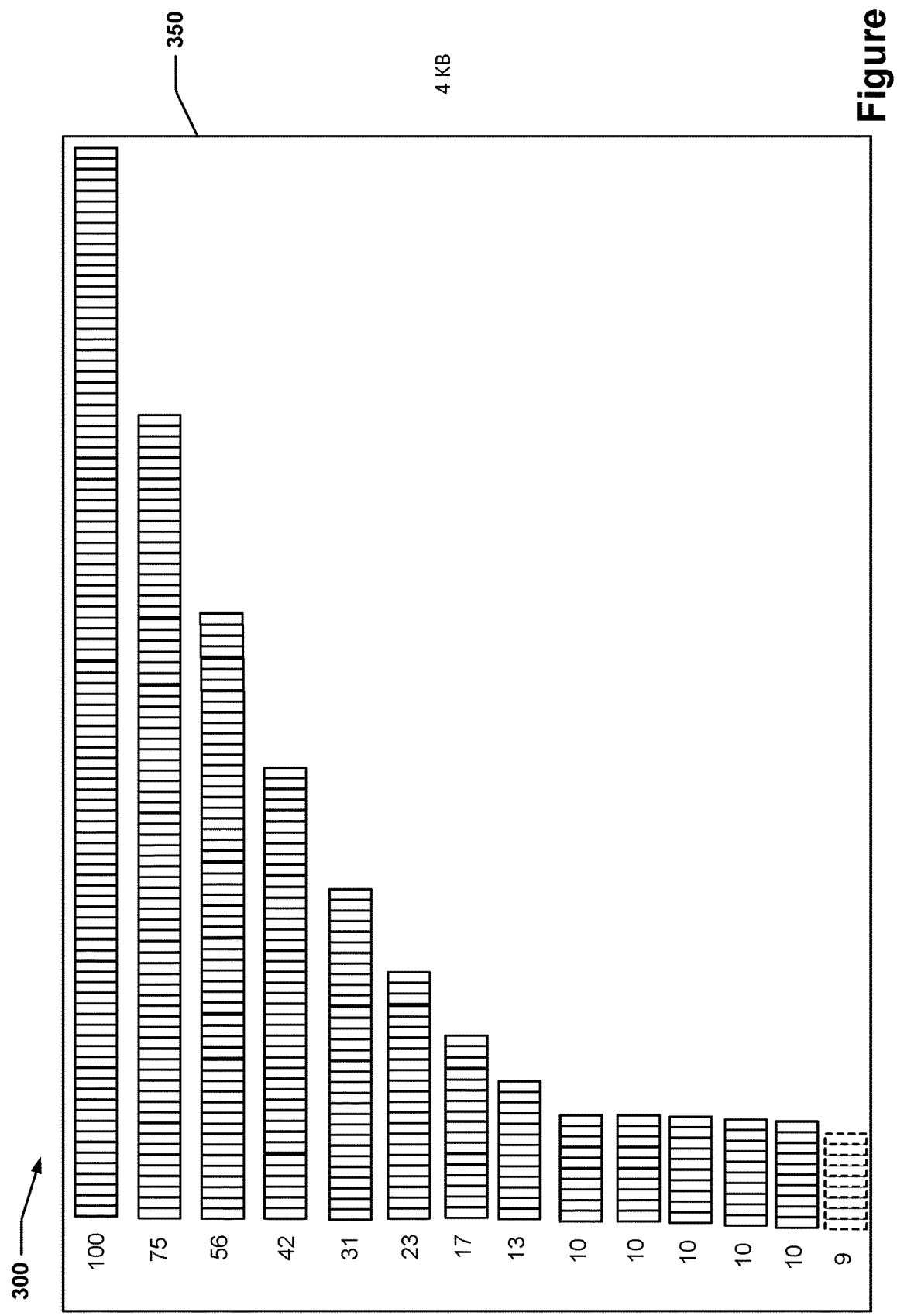

FIGS. 3A and 3B are diagrams of an example of an automatically expanding KLL sketch data structure 300. Similar to the KLL sketch data structure 200, the automatically expanding KLL sketch data structure 300 may be a group of arrays of different lengths arranged in an order. For illustrative purposes, the KLL sketch data structure 300 may have the parameters of K=100, c=¾, and minwidth=10.

Unlike the KLL sketch data structure 200, the number of levels of the automatically expanding KLL sketch data structure 300 may be based on a total allocated amount of memory, a size of the data type of the streaming set, and parameters such as K and minwidth. If the maximum capacity of the buffer (in number of elements) is less than K plus minwidth, the data structure 300 may include a single level. If the maximum capacity of the buffer (in number of elements) is greater than to K plus minwidth, the number of levels may be equal to a number of levels for storing the maximum capacity of the buffer in the data structure 300 based on K and c.

For example, the automatically expanding KLL sketch data structure 300 may be initially allocated a buffer 310 having a size based on a sparse sketch size independent of a type of data of the streaming set. The sparse sketch size (in number of elements) may be smaller than the parameter K and the data structure 300 may initially include a single level configured to store a number of elements less than the maximum size of the top level. For example, in some implementations, the initial amount of memory for buffer 310 may be 256 bytes, which is significantly smaller than a conventional KLL sketch with K=200 that would use at least 1.6 KB for 8 byte elements (e.g., a big integer data type). For instance, accounting for overhead, the data structure 300 may store 26 elements in the buffer 310. Accordingly, in the case of many sparse KLL sketches (e.g., for new streaming sets with unknown size or streaming sets based on a group by operation), significant amounts of memory may be conserved.

The size of the data structure 300 may grow as needed. When the buffer 310 is full, a buffer 320 may be allocated. The size of the buffer 320 (512 B) may be based on an incremental amount of memory that is greater than or equal to the initial amount of memory (256 bytes). In some implementations, the incremental amount of memory may not depend on the number of levels in the KLL sketch data structure 300. For example, the incremental amount may double the current size of the buffer, or increase by a fixed amount (e.g., 1 KB). For instance, the data structure 300 may store 52 elements in a single level in the buffer 320 (512 B). The capacity of the data structure 300 increases by 26 elements. When the buffer 320 becomes full, the buffer 330 (1 KB) may be allocated.

When the maximum capacity of the buffer is greater than K, the n umber of levels in the data structure 300 may depend on the number of total allocated amount of memory and a size of the data type of the streaming set. For example, the buffer 330 may have a maximum capacity of 104 elements, but the maximum size of a level (K) may be 100 and the minimum size of a level may be 10. In this example, the top level may be allocated K elements, but the additional 4 elements may be smaller than the minimum size of a level, so the data structure 300 may have only 1 level in buffer 330.

When the top level stored in buffer 330 is full (at K elements), the data structure 300 may be allocated a buffer 340 (2 KB), which may have a total capacity of 208 elements. The top level may have a size of K elements (e.g., 100), the second level may have a size of K*c elements (e.g., 75), and the third level may include the remaining capacity in elements (e.g., 208−100−75=33 elements).

As illustrated in FIG. 3B, when the top level stored in buffer 340 is full, the data structure 300 may be allocated a buffer 340 (4 KB), which may have a total capacity of 416 elements. The levels may have sizes of 100, 75, 56, 42, 31, 23, 17, 13, 10, 10, 10, 10, and 10, for a total capacity of 407 elements. The remaining capacity of 9 elements may be smaller than the minwidth, so an additional level may not be added.

FIG. 4 is a diagram of an example of a linked page structure 400 for a KLL sketch (e.g., KLL sketch data structure 300). The linked page structure 400 may include multiple pages 410. Each page 410 may correspond to a memory page, which may be a fixed length defined for a particular computer architecture. For example, memory pages may range from 4 KB to 16 GB or higher in specialized architectures. In many systems an 8 KB page size is configured. In the context of a KLL sketch, an 8 KB page may support a stream size of 100 billion 8 B items. For larger data types, the stream size supported by a single page is substantially smaller. Conventionally, when a KLL sketch is larger than a memory page, the KLL sketch is stored in Blob storage for the DBMS, which has slower read and write performance as the KLL sketch is serialized and deserialized.

In the linked page structure 400, a KLL sketch larger than the page size may be stored in multiple linked pages. Each page 410 may include a KLL byte header 412 and a buffer 414. The first page 410 of the linked page structure 400 may include a KLL header 420. The KLL header 420 may store parameters of the KLL sketch data structure 300 such as capacity, number of levels, parameter K, parameter c, a number of elements, etc. The KLL byte header 412 may link the page 410 to the KLL sketch data structure 300 and/or the linked page structure 400. The KLL byte header 412 may include an identifier of the KLL sketch data structure 300 and an identifier of the page 410. In some implementations, the KLL byte header 412 may include a checksum to validate that the page has correct data. In some implementations, the KLL byte header 412 may have a length of approximately 12 bytes. The buffer 414 may store the elements of the KLL sketch data structure 300. The buffer 414 may be almost the size of the page 410 (e.g., minus the overhead for the KLL byte header 412 and KLL header 420).

In an implementation, an application programming interface (API) for the linked page structure 400 may hide the internal management of the buffers 414 such that operations on the KLL sketch may be performed without reference to a specific page. This linked page structure 400 supports KLL sketches for streaming sets with more than 100 billion elements, without use of Blob storage. For example, the linked page structure 400 may be stored in a cache, computer memory (e.g., random access memory (RAM)), or virtual memory. The linked page structure 400 may be stored without serializing the linked page structure 400. Having the pages in a linked manner allows an exponential increase in the supported stream size with each page, as opposed to an additive increase if the streaming set is divided into separate 8 KB sketches.

In an aspect, a computer system utilizing the data structure 300 and the linked page structure 400 may utilize one or more processor vectorization capabilities. A processor vectorization capability may refer to an ability of a computer processor to perform an operation on a vector instead of a single value. For example, a vectorization capability may refer to a single instruction/multiple data (SIMD) operation. The vector processing capabilities may be used for operations on the data structure 300 and/or the linked page structure 400 that apply to multiple values. For example, instead of adding single elements to the data structure 300, a vectorized update may operate on multiple new values to be added to the data structure 300. The compaction operation may also utilize a vector processing capability. For instance, randomly eliminating odd or even indexed elements may be performed based on a mask and vector permute operation. As another example, the merging of a lower level into an upper level may be vectorized using a bitonic merge function, which reduces branch misprediction. Bitonic sort may be used when a level includes fewer than 16 elements. Similarly, a query operation on the data structure 300 may utilize a sort merge operation across all levels of the KLL sketch data structure 300 using a vector central processing unit (CPU) command.

For instance, a bitonic merge may be implemented based on the following pseudo-code, where A and B are input registers storing vectors of the levels to be merged. The operations on vectors instead of individual elements may reduce execution time of operations on the KLL data structure 300.

B=shuffle_vector(B, B, imm1)//reverses vector B
L1=min_vector(A, B)
H1=max_vector(A, B)//L1 comparisons
L1p=shuffle_vector(L1, H1, imm2)
H1p=shuffle_vector(L1, H1, imm3)//L1 shuffles
L2=min_vector(L1p, H1p)
H2=max_vector(L1p, H1p)//L2 comparisons
L2p=shuffle_vector(L2, H2, imm4)
H2p=shuffle_vector(L2, H2, imm5)//L2 shuffles
L3=min_vector(L2p, H2p)
H3=max_vector(L2p, H2p)//L3 comparisons
L3p=shuffle_vector(L3, H3, imm6)
H3p=shuffle_vector(L3, H3, imm7)//L3 shuffles In another aspect, the data structure 300 may provide dynamic error bounds for queries. Generally, the error bound for a KLL data structure is fixed based on the parameters of the KLL data structure (e.g., K). For example, error bound=2.296/pow (K, 0.9723). A KLL sketch with K=200 and 8 byte data type size may have an error bound of 1.33%. Such a KLL sketch with an 8 KB memory allocation may support a stream size of approximately one billion elements. In some implementations, the error bound may be tightened based on the actual number of elements in the streaming set. For example, the dynamic error bound may be set based on an initial estimated size of the streaming set and an initial memory allocation. The dynamic error bound may be updated based on a current stream size greater than the initial estimated size and the total allocated amount of memory. For example, a KLL sketch data structure 300 may initially be configured with a maximum allocated memory size of 8 KB to fit on a single memory page. The estimated size of the streaming set may be one hundred thousand elements. The data structure 300 may be initialized with parameter K of 350, which would provide an error bound of 0.77%. If the actual size of the streaming set exceeds the estimated size, the dynamic error bound and parameter K may be updated. For example, K may be decreased to 300, resulting in an error bound of 0.89%. A new data structure 300 may be re-initialized with the new set of parameters and level boundaries may be adjusted. The existing data structure 300 may be merged with the new data structure 300 with different K values. Accordingly, for a given amount of memory, a dynamic error bound may provide improved precision for queries when the size of the streaming set is less than a maximum supported size for a required error bound.

FIG. 5 is a schematic diagram of an example of an apparatus 500 (e.g., a computing device) for executing a DBMS utilizing a KLL data structure. The apparatus 500 may be implemented as one or more computing devices in the network 120 such as the database server 140.

In an example, apparatus 500 can include a processor 502 and/or memory 504 configured to execute or store instructions or other parameters related to providing an operating system 506, which can execute one or more applications or processes, such as, but not limited to, the DBMS 142, which may include a KLL sketch component 150. The KLL sketch component 150 may include, for example, memory allocation component 520, a KLL structure component 522, a KLL operation component 524, a query component 526, and/or an error bound component 528. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like. In some implementations, the processor 502 may be a central processing unit (CPU). The processor 502 may have a vectorization capability 510. For instance, the vectorization capability 510 may be a set of vector CPU commands such as SIMD commands or advanced vector extensions (AVX) instructions. Memory 504 may store instructions, parameters, data structures, etc. for use/execution by processor 502 to perform functions described herein. The apparatus 500 can include a storage device 508 such as a hard drive or solid state drive (SSD) for storing data.

The memory allocation component 520 may be configured to allocate memory from the computer memory 504 to a buffer of a KLL sketch data structure 300. For example, the memory allocation component 520 may allocate an initial amount of memory from the computer memory to a buffer of a KLL sketch data structure based on a sparse sketch size independent of a data type of the streaming set. The memory allocation component 520 may allocate an incremental amount of memory greater than the initial amount of memory from the computer memory to the buffer of the KLL sketch data structure in response to a size of the streaming set exceeding a supported stream size of the KLL sketch data structure.

The KLL structure component 522 may be configured to determine a number of levels of the KLL sketch data structure based on a total allocated amount of memory and a size of the data type of the streaming set. For example, the KLL structure component 522 may subtract an amount of overhead from the total allocated amount of memory and divide the remaining allocated amount of memory by the size of the data type to determine a maximum total capacity (e.g., number of elements) of the KLL sketch data structure 300. If the maximum total capacity is less than K plus minwidth, the KLL structure component 522 may assign single level. If the maximum total capacity is greater than or equal to K plus minwidth, the KLL structure component 522 may assign as many full levels as possible, with each full level X having a width of $c^{\wedge}(H-X)*K$. If the width of a lowest level would be less than the minwidth, then the KLL structure component 522 may not assign a level and the total capacity of the KLL sketch data structure 300 may be less than the maximum total capacity.

The KLL operation component 524 may be configured to perform operations on the KLL sketch data structure 300. For example, the KLL operation component 524 may add new elements from the streaming set to the KLL sketch data structure 300 based on the number of levels. For instance, the KLL operation component 524 may add new elements to L1 and compact L1 into higher levels when L1 is full. In some implementations, the KLL operation component 524 may be configured to execute a vectorized KLL sketch update operation on the buffer utilizing a processor vectorization capability. The processor vectorization capability may be specific to an architecture of the processor 502. Generally, the processor vectorization capability includes a plurality of vector CPU commands that perform processor operations on a vector of data. In some implementations, a vector CPU commands may be used to perform a sort merge operation on two levels of the KLL sketch data structure 300.

The query component 526 may be configured to query the KLL sketch data structure for a value associated with the streaming set. For example, the query may be for one or more of an approximate quantile of the value or an approximate rank of the value. For instance, to query the KLL sketch data structure 300 for an approximate quantile of a value within the streaming set, the query component 526 may perform a sort merge operation across all levels of the KLL sketch data structure using a vector CPU command.

The error bound component 528 may be configured to set a dynamic error bound for the KLL sketch data structure. For example, the error bound component 528 may set the dynamic error bound based on an initial estimated size of the streaming set and an initial memory allocation. For instance, the error bound component 528 may set a value of the parameter K that supports the estimated size of the streaming set within the initial memory allocation. The error bound component 528 may update the dynamic error bound based on a current stream size greater than the initial estimated size and the total allocated amount of memory. For instance, if the size of the streaming set exceeds the estimated size of the streaming set, the error bound component 528 may decrease the parameter K to support a larger streaming set within the same amount of memory, but with a larger error bound.

FIG. 6 is a flow diagram of an example of a method 600 for managing memory of a KLL data structure. For example, the method 600 can be performed by the system 100 and/or one or more components thereof to manage memory for a KLL data structure for a streaming set.

At block 610, the method 600 includes allocating an initial amount of memory from a computer memory to a buffer of a KLL sketch data structure based on a sparse sketch size independent of a data type of the streaming set. In an example, the memory allocation component 520, e.g., in conjunction with processor 502, memory 504, and operating system 506, can allocate an initial amount of memory from the computer memory 504 to a buffer 310 of a KLL sketch data structure 300 based on a sparse sketch size independent of a data type of the streaming set.

At block 620, the method 600 optionally includes setting a dynamic error bound based on an initial estimated size of the streaming set and an initial memory allocation. In an example, the error bound component 528, e.g., in conjunction with processor 502, memory 504, and operating system 506, can set the dynamic error bound based on the initial estimated size of the streaming set and an initial memory allocation (e.g., for buffer 310).

At block 630, the method 600 includes allocating an incremental amount of memory greater than the initial amount of memory from the computer memory to the buffer of the KLL sketch data structure in response to a size of the streaming set exceeding a supported stream size of the KLL sketch data structure. In an example, the memory allocation component 520, e.g., in conjunction with processor 502, memory 504, and operating system 506, can allocate the incremental amount of memory greater than the initial amount of memory from the computer memory 504 to the buffer 330 of the KLL sketch data structure 300 in response to a size of the streaming set exceeding a supported stream size of the KLL sketch data structure. For example, at sub-block 632, the block 630 may optionally include allocating an additional memory page 410 to the KLL sketch data structure. Each page 410 of the KLL sketch data structure includes a header 412 that links the page to the KLL sketch data structure 300 and a portion of the buffer 414 that stores elements of the KLL sketch data structure. The pages of the KLL sketch data structure 300 may be stored in the computer memory 504 or a virtual memory, thereby avoiding a Blob storage.

At block 640, the method 600 includes determining a number of levels of the KLL sketch data structure based on a total allocated amount of memory and a size of the data type of the streaming set. In an example, the KLL structure component 522, e.g., in conjunction with processor 502, memory 504, and operating system 506, can determine the number of levels of the KLL sketch data structure based on the total allocated amount of memory and the size of the data type of the streaming set.

At block 650, the method 600 includes adding new elements from the streaming set to the KLL sketch data structure based on the number of levels. In an example, the KLL operation component 524, e.g., in conjunction with processor 502, memory 504, and operating system 506, can add new elements from the streaming set to the KLL sketch data structure 300 based on the number of levels. For example, at sub-block 652, the block 650 may include executing a vectorized KLL sketch update operation on the buffer utilizing a processor vectorization capability. As another example, at sub-block 654, the block 650 may include compacting a level of the KLL sketch data structure using a vectorized sort merge of two levels.

At block 660, the method 600 includes updating the dynamic error bound based on a current stream size greater than the initial estimated size and the total allocated amount of memory. In an example, the error bound component 528, e.g., in conjunction with processor 502, memory 504, and operating system 506, can update the dynamic error bound based on a current stream size greater than the initial estimated size and the total allocated amount of memory.

At block 670, the method 600 optionally includes querying the KLL sketch data structure for a value associated with the streaming set. In an example, the query component 526, e.g., in conjunction with processor 502, memory 504, and operating system 506, may query the KLL sketch data structure for a value associated with the streaming set. For example, in some implementations, the query is for one or more of an approximate quantile of the value, or approximate rank of the value. In some implementations, at sub-block 672, the block 670 may include performing a sort merge operation across all levels of the KLL sketch data structure using a vector CPU command.

Figure 7:
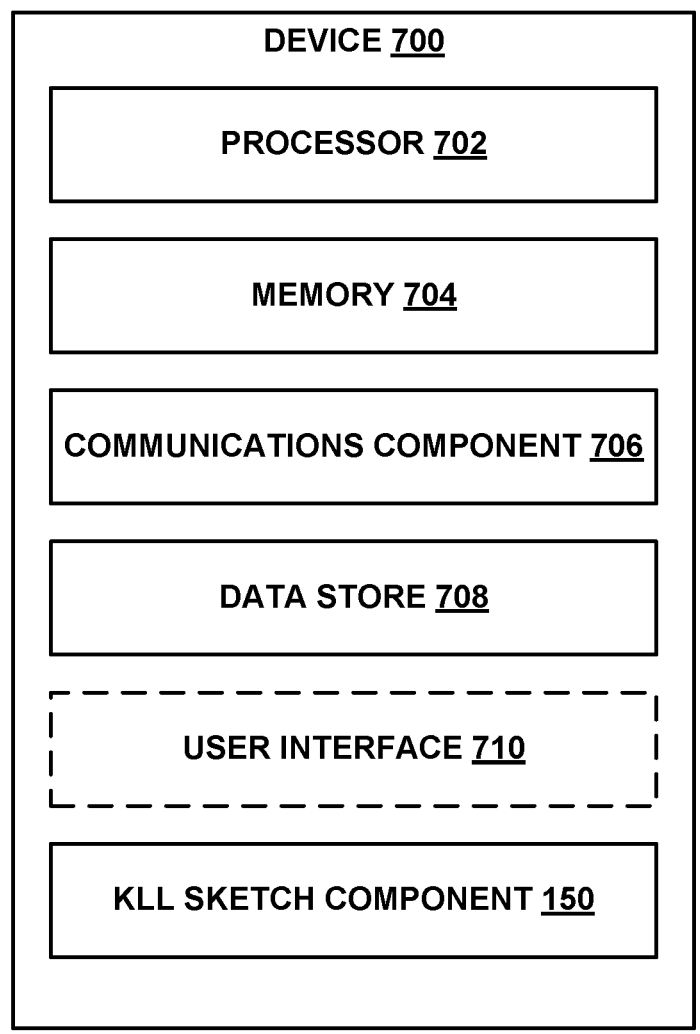
FIG. 7 is a diagram of an example of a device including additional optional component details as those shown in FIG. 5.

FIG. 7 illustrates an example of a device 700 including additional optional component details as those shown in FIG. 5. In one aspect, device 700 may include processor 702, which may be similar to processor 702 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory 704 such as for storing local versions of operating systems (or components thereof) and/or applications being executed by processor 702. For example, the memory 704 may store a KLL sketch component 150 including executable instructions for the memory allocation component 520, the KLL structure component 522, the KLL operation component 524, the query component 526, the error bound component 528, or any software components thereof. Memory 704 can include a type of memory usable by a computer, such as random access memory (RAM), read only memory (ROM), tapes, magnetic discs, optical discs, volatile memory, non-volatile memory, and any combination thereof.

Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the KLL sketch component 150.

Device 700 may optionally include a user interface component 710 operable to receive inputs from a user of device 700 (e.g., datacenter maintenance personnel) and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. Non-transitory computer-readable media excludes transitory signals. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The following provides an overview of aspects of the present disclosure:

Aspect 1: An apparatus for managing memory for a KLL sketch of a streaming set, comprising: a computer memory configured to store computer-executable instructions and a representation of the streaming set; and a processor coupled to the computer memory and configured to execute the instructions to: allocate an initial amount of memory from the computer memory to a buffer of a KLL sketch data structure based on a sparse sketch size independent of a data type of the streaming set; allocate an incremental amount of memory greater than or equal to the initial amount of memory from the computer memory to the buffer of the KLL sketch data structure in response to a size of the streaming set exceeding a supported stream size of the KLL sketch data structure; determine a number of levels of the KLL sketch data structure based on a total allocated amount of memory and a size of the data type of the streaming set; and add new elements from the streaming set to the KLL sketch data structure based on the number of levels.

Aspect 2: The apparatus of Aspect 1, wherein to allocate the incremental amount of memory the processor is configured to allocate an additional memory page to the KLL sketch data structure, wherein each memory page of the KLL sketch data structure includes a header that links the page to the KLL sketch data structure and a portion of the buffer that stores elements of the KLL sketch data structure.

Aspect 3: The apparatus of Aspect 2, wherein the header includes an identifier of the KLL sketch data structure, an identifier of the memory page, a capacity of the KLL sketch data structure, a number of levels, a size of a first level (k), a decay factor (c), and a number of elements.

Aspect 4: The apparatus of Aspect 2 or 3, wherein the memory pages of the KLL sketch data structure are stored in the computer memory or a virtual memory.

Aspect 5: The apparatus of any of Aspects 1-4, wherein to add new elements from the streaming set to the KLL sketch data structure based on the number of levels, the processor is configured to execute a vectorized KLL sketch update operation on the buffer utilizing a processor vectorization capability.

Aspect 6: The apparatus of Aspect 5, wherein to add the new elements when a lowest level of the KLL sketch data structure is full, the processor is configured to compact a level of the KLL sketch data structure using a vectorized sort merge of two levels.

Aspect 7: The apparatus of any of Aspects 1-6, wherein the processor is configured to query the KLL sketch data structure for a value associated with the streaming set.

Aspect 8: The apparatus of Aspect 7, wherein the query is for one or more of an approximate quantile of the value or an approximate rank of the value.

Aspect 9: The apparatus of Aspect 7 or 8, wherein the value is within a dynamic error bound based on a number of elements in the streaming set in relation to the total allocated amount of memory for the KLL sketch data structure.

Aspect 10: The apparatus of Aspect 9, wherein the processor is further configured to: set the dynamic error bound based on an initial estimated size of the streaming set and an initial memory allocation; and update the dynamic error bound based on a current stream size greater than the initial estimated size and the total allocated amount of memory.

Aspect 11: The apparatus of Aspect 7, wherein to query the KLL sketch data structure for an approximate quantile of a value within the streaming set, the processor is configured to perform a sort merge operation across all levels of the KLL sketch data structure using a vector central processing unit (CPU) command.

Aspect 12: A method of managing memory for a representation of a streaming set, comprising: allocating an initial amount of memory from a computer memory to a buffer of a KLL sketch data structure based on a sparse sketch size independent of a data type of the streaming set; allocating an incremental amount of memory greater than the initial amount of memory from the computer memory to the buffer of the KLL sketch data structure in response to a size of the streaming set exceeding a supported stream size of the KLL sketch data structure; determining a number of levels of the KLL sketch data structure based on a total allocated amount of memory and a size of the data type of the streaming set; and adding new elements from the streaming set to the KLL sketch data structure based on the number of levels.

Aspect 13: The method of Aspect 12, further comprising querying the KLL sketch data structure for a value associated with the streaming set.

Aspect 14: The method of Aspect 13, wherein the value is within a dynamic error bound based on a number of elements in the streaming set in relation to the total allocated amount of memory for the KLL sketch data structure, the method further comprising: setting the dynamic error bound based on an initial estimated size of the streaming set and an initial memory allocation; and updating the dynamic error bound based on a current stream size greater than the initial estimated size and the total allocated amount of memory.

Aspect 15: The method of Aspect 13 or 14, wherein querying the KLL sketch data structure for an approximate quantile of a value within the streaming set comprises performing a sort merge operation across all levels of the KLL sketch data structure using a vector central processing unit (CPU) command.

Aspect 16: The method of any of Aspects 12-15, wherein allocating the incremental amount of memory comprises allocating an additional memory page to the KLL sketch data structure, wherein each memory page of the KLL sketch data structure includes a header that links the page to the KLL sketch data structure and a portion of the buffer that stores elements of the KLL sketch data structure.

Aspect 17: The method of Aspect 16, wherein the header includes an identifier of the KLL sketch data structure, an identifier of the memory page, a capacity of the KLL sketch data structure, a number of levels (H), a size of a first level (K), a level reduction factor (c), and a number of elements.

Aspect 18: The method of any of Aspects 12-17, wherein adding new elements from the streaming set to the KLL sketch data structure based on the number of levels comprises executing a vectorized KLL sketch update operation on the buffer utilizing a processor vectorization capability.

Aspect 19: The method of Aspect 17, wherein adding the new elements comprises compacting a level of the KLL sketch data structure using a vectorized sort merge of two levels.

Aspect 20: A non-transitory computer-readable medium storing computer-executable code, comprising code to perform the method of any of the above Aspects.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for managing memory for a quantile sketch of a streaming set, comprising:
   one or more computer memories, individually or in combination, configured to store computer-executable instructions and a representation of the streaming set; and
   one or more processors coupled to the computer memory and, individually or in combination, configured to execute the instructions to:
      allocate a memory page having an initial amount of memory from the one or more computer memories to a buffer of a quantile sketch data structure based on a sparse sketch size independent of a data type of the streaming set;
      determine a supported stream size of the quantile sketch data structure based on a number of levels of the quantile sketch data structure, a number of elements in a highest level, a total allocated amount of memory, and a size of the data type of the streaming set;
      allocate one or more additional memory pages having an incremental amount of memory greater than or equal to the initial amount of memory from the one or more computer memories to the buffer of the quantile sketch data structure in response to a size of the streaming set exceeding the supported stream size of the quantile sketch data structure;
      determine a number of levels of the quantile sketch data structure based on a total allocated amount of memory and a size of the data type of the streaming set; and
      add new elements from the streaming set to the quantile sketch data structure based on the number of levels.

2. The apparatus of claim 1, wherein each memory page of the quantile sketch data structure includes a header that links the memory page to the quantile sketch data structure and a portion of the buffer that stores elements of the quantile sketch data structure.

3. The apparatus of claim 2, wherein the header includes an identifier of the quantile sketch data structure, an identifier of the memory page, a capacity of the quantile sketch data structure, a number of levels, a size of a first level (k), a decay factor (c), and a number of elements.

4. The apparatus of claim 2, wherein the memory pages of the quantile sketch data structure are stored in the one or more computer memories or a virtual memory.

5. The apparatus of claim 1, wherein to add new elements from the streaming set to the quantile sketch data structure based on the number of levels, the one or more processors, individually or in combination, are configured to execute a vectorized quantile sketch update operation on the buffer utilizing a processor vectorization capability.

6. The apparatus of claim 5, wherein to add the new elements when a lowest level of the quantile sketch data structure is full, the one or more processors, individually or in combination, are configured to compact a level of the quantile sketch data structure using a vectorized sort merge of two levels.

7. The apparatus of claim 1, wherein the one or more processors, individually or in combination, are configured to query the quantile sketch data structure for a value associated with the streaming set.

8. The apparatus of claim 7, wherein the query is for one or more of an approximate quantile of the value or an approximate rank of the value.

9. The apparatus of claim 7, wherein the value is within a dynamic error bound based on a number of elements in the streaming set in relation to the total allocated amount of memory for the quantile sketch data structure.

10. The apparatus of claim 9, wherein the one or more processors, individually or in combination, are further configured to:
   set the dynamic error bound based on an initial estimated size of the streaming set and an initial memory allocation; and
   update the dynamic error bound based on a current stream size greater than the initial estimated size and the total allocated amount of memory.

11. The apparatus of claim 7, wherein to query the quantile sketch data structure for an approximate quantile of a value within the streaming set, the one or more processors, individually or in combination are configured to perform a sort merge operation across all levels of the quantile sketch data structure using a vector central processing unit (CPU) command.

12. A method of managing memory for a representation of a streaming set, comprising:
   allocating a memory page having an initial amount of memory from a computer memory to a buffer of a quantile sketch data structure based on a sparse sketch size independent of a data type of the streaming set;
   determining a supported stream size of the quantile sketch data structure based on a number of levels of the quantile sketch data structure, a number of elements in a highest level, a total allocated amount of memory, and a size of the data type of the streaming set;
   allocating one or more additional memory pages having an incremental amount of memory greater than the initial amount of memory from the computer memory to the buffer of the quantile sketch data structure in response to a size of the streaming set exceeding the supported stream size of the quantile sketch data structure;

determining a number of levels of the quantile sketch data structure based on a total allocated amount of memory and a size of the data type of the streaming set; and adding new elements from the streaming set to the quantile sketch data structure based on the number of levels.

13. The method of claim 12, further comprising querying the quantile sketch data structure for a value associated with the streaming set.

14. The method of claim 13, wherein the value is within a dynamic error bound based on a number of elements in the streaming set in relation to the total allocated amount of memory for the quantile sketch data structure, the method further comprising:

setting the dynamic error hound based on an initial estimated size of the streaming set and ara initial memory allocation; and updating the dynamic error bound based on a current stream size greater than the initial estimated size and the total allocated amount of memory.

15. The method of claim 13, wherein querying the quantile sketch data structure for an approximate quantile: of a value within the streaming set comprises performing a sort merge operation across all levels of the quantile sketch data structure using a vector central processing unit (CPU) command.

16. The method of claim 12, wherein allocating the incremental amount of memory comprises allocating an additional memory page to the quantile sketch data structure, wherein each memory page of the quantile sketch data structure includes a header that links the memory page to the quantile sketch data structure and a portion of the buffer that stores elements of the quantile sketch data structure.

17. The method of claim 16, wherein the header includes an identifier of the quantile sketch data structure, an identifier of the memory page, a capacity of the quantile sketch data structure, a number of levels (H), a size of a first level (K), a level reduction factor (c), and a number of elements.

18. The method of claim 12, wherein adding new elements from the streaming set to the quantile sketch data structure based on the number of levels comprises executing a vectorized quantile sketch update operation on the buffer utilizing a processor vectorization capability.

19. The method of claim 18, wherein adding the new elements comprises compacting a level of the quantile sketch data structure using a vectorized sort merge of two levels.

20. A non-transitory computer-readable medium storing computer-executable code, comprising code to:

allocate a memory page having an initial amount of memory from a computer memory to a buffer of a quantile sketch data structure for a streaming set;

set a dynamic error bound for queries of the quantile sketch data structure based on an initial estimated size of the streaming set and the initial amount of memory;

determine a number of levels of the quantile sketch data structure based on a total allocated amount of memory and a size of a data type of the streaming set;

add new elements from the streaming set to the quantile sketch data structure based on the number of levels;

determine a supported stream size of the quantile sketch data structure based on a number of levels of the quantile sketch data structure, a number of elements in a highest level, a total allocated amount of memory, and a size of the data type of the streaming set; and update the dynamic error bound based on a current stream size greater than the initial estimated size and less than the supported stream size for the total allocated amount of memory.

* * * * *